United States Patent Office 3,145,188
Patented Aug. 18, 1964

3,145,188
REFRACTORY CEMENT COMPOSITIONS
Jacques R. Martinet, San Jose, and William M. Hildinger, Campbell, Calif., assignors to Kaiser Aluminum & Chemical Corporation, Oakland, Calif., a corporation of Delaware
No Drawing. Filed Nov. 4, 1960, Ser. No. 67,154
8 Claims. (Cl. 260—41)

The present invention relates to nonacid refractory mortars. In practice mortars are stored in powder form and when needed, the powder is mixed with measured amounts of water to produce a wet mix of desired consistency depending on whether it is to serve as a trowel mortar or a dip mortar.

A mortar of good quality should readily mix with cold water without forming lumps. The wet mix should provide an adequate workability time, i.e., when used as a dip mortar, it should allow a brick dipped into the wet mix to be placed upon another brick and be readily adjusted to precisely its proper position relative to said other brick before it thickens to an extent where it opposes relative movement of the bricks and consequently makes any further adjustment difficult; but once sufficient time has elapsed to permit an experienced worker to adjust the brick to its proper position, the wet mix should quickly solidify to an extent where any relative displacement becomes impossible and a dependable "green strength" bond is established between the bricks.

When dry mortar mixes are stored for extended periods of time, they have a tendency to lose the desirable qualities mentioned above. Lumps tend to form during storage or, later, during mixing when they come into contact with water, so that it is difficult, if not impossible, to establish a wet mix of uniform consistency. This deterioration of dry mortar mixes during storage is especially noticeable when the ambient temperature rises during storage above critical upper limits. Furthermore, wet mixes prepared from mortar that has been stored for extended periods of time and/or has been exposed to high ambient temperatures during storage, fail to provide adequate workability and on the other hand may require too long a period of time for setting into a green bond of the proper strength.

It is an object of the invention to provide a high class refractory mortar that may be stored for extended periods of time without losing its desirable characteristics.

More particularly, it is an object of this invention to provide a high quality mortar that may be exposed to relatively high temperatures during storage without impairment of its desirable qualities.

Another object of the invention is to provide a refractory mortar that will not lump in storage and will readily mix with cold water, even after extended periods of storage and exposure to temperatures above 100° C.

Yet another object of the invention is to provide a mortar, of the type referred to, that provides adequate workability and thereafter sets up quickly to a green bond of proper strength.

It has been found that the storage characteristics of nonacid, i.e., basic or neutral, refractory mortars are greatly improved by the incorporation, into the dry mortar mix, of a water-soluble polymer of the sodium salt of acrylic acid. This material is available in commerce under the trade name of Cyanamer 370, manufactured by American Cyanamid Company. It is available as small, cream-colored flakes which are slightly hygroscopic, acts as a thickener in water, is stable in both slightly acid and basic solutions, and has a pH of about 9 to 10 in 1% water solution. An aqueous solution is miscible with acetone, ethanol, ethylene glycol and glycerol. The viscosity of a 5% water solution at 30° C., pH 7.1, is 170 cps., is determined on a Brookfield Viscosimeter, Spindle No. 3. The salt may be partially hydrolyzed prior to use, also.

When small amounts of Cyanamer 370 are added to the dry mortar mix, the resultant products exhibit many conspicuous improvements in the properties that establish a high quality mortar. In dry form the mixes may be stored for long periods of time without deterioration of their desirable characteristics and without being adversely affected by rises in the ambient temperature to as high as 120° C. When poured from the storage containers, the mixes display no lump formation, and they display none, or only very little, lump formation, when mixed with cold water. The resultant wet mixes provide excellent workability and continue to do so even when the temperature of the wet mixes is raised to as high as 60° C., whereat most mortars of conventional composition will set too rapidly to provide any useful workability time. Moreover, after the wet mixes prepared from the mortar of our invention have provided an adequate workability period, they set up quickly and thus prevent accidental displacement of any newly laid bricks, and establish green bonds of dependable strength, in fact, green bonds of significantly greater strength than displayed by mortars of the same composition without the addition of Cyanamer 370. We have found that best results are obtained when the additions of Cyanamer 370 range from between .05% to 1.00% by weight of the total mix. If more than 1% by weight of Cyanamer 370 is added to the mortar, the set-up time of the wet mix becomes too long, and the cost of the product may be economically prohibitive. Minor amounts of a clay, such as bentonite, and of a cold bond, such as sodium silicate, are also added if desired.

In carrying out our invention in practice, mortars of the following composition were prepared:

Example 1

| | Percent by weight |
|---|---|
| Chromite | 83.7 |
| Periclase | 11.2 |
| Sodium silicate | 4.0 |
| Bentonite | 1.0 |
| Cyanamer 370 | 0.1 |

In the above example the chemical analysis of the chromite was as follows:

| | Percent by weight |
|---|---|
| $SiO_2$ | 4.5 |
| FeO | 12.0 |
| $Al_2O_3$ | 28.0 |
| $Cr_2O_3$ | 29.7 |
| CaO | 0.7 |
| MgO | 25.1 |

The chemical analysis of bentonite was as follows:

| | Percent by weight |
|---|---|
| $SiO_2$ | 60.8 |
| $Al_2O_3$ | 19.8 |
| $Fe_2O_3$ | 3.6 |
| MgO | 0.9 |
| CaO | 0.8 |
| $TiO_2$ | 0.6 |
| Loss on ignition (e.g., $H_2O$; $SO_3$; $CO_2$ etc.) | 13.5 |

The periclase contained at least 92.0% MgO, remainder the usual impurities.

Example 2

| | Percent by weight |
|---|---|
| Chromite | 83.7 |
| Periclase | 11.1 |
| Sodium silicate | 4.0 |
| Bentonite | 1.0 |
| Cyanamer 370 | 0.2 |

In Example 2 the chemical analyses of the chromite, periclase and bentonite components were the same as those given in Example 1. In both examples the constituent materials were in finely divided form of a particle size ranging from the sizes passing through an 80 mesh screen to the sizes retained on a 200 mesh screen. These materials were thoroughly blended in a conventional manner using conventional blending equipment.

The mortars exemplified by Examples 1 and 2 stored well. Their characteristics were not adversely affected by temperature changes, during their storage, which raised the ambient temperature well above 100° C. They mixed well with cold water without any significant lump formation. The wet mixes displayed an excellent workability time compared with mortars of the same composition but without the Cyanamer 370 additive, as best demonstrated by the following measurements:

|  | Workability time in seconds |
| --- | --- |
| Example 1 | 15 to 30 |
| Example 2 | 30 |
| Regular mortar | 2 to 4 |

The workability of the wet mixes prepared from the mortars according to the Examples 1 and 2 remained substantially the same when the temperatures of the mixes was raised to 60° C.

As another example, a mortar of the following composition was prepared:

*Example 3*

|  | Percent by weight |
| --- | --- |
| MgO | 98.7 |
| Bentonite | 1.0 |
| Cyanamer | 0.3 |
|  | 100.0 |

In this example the chemical analysis of the periclase was as follows:

|  | Percent by weight |
| --- | --- |
| MgO | 95.5 |
| $SiO_2$ | 2.1 |
| CaO | 1.3 |
| Remainder (e.g., $Fe_2O_3$, $Al_2O_3$, $B_2O_3$, etc.) | 1.1 |

The chemical analysis of the bentonite component was the same as that given in Example 1. The component materials were in finely divded form and were thoroughly blended on a conventional blending equipment. The workability time of a wet dip mortar mix prepared from Example 3 was sixty seconds, and this mortar mix retained substantially the same workability up to a temperature of 60° C., whereas the workability of the best mortar of comparable composition but without the Cyanamer 370 additive, dropped to from 2 seconds to 4 seconds by the time the temperature of the mix had been raised to only 40° C.

While we have illustrated our invention with the aid of exemplary embodiments thereof, the invention is not limited to the specific constituents of the mortars employed in these embodiments nor to the specific percentages stated in the examples, and is also applied to a refractory mortar consisting essentially of a major portion of aluminum oxide and a water-soluble polymer of the sodium salt of acrylic acid in quantities of from 0.05% to 1.0% by weight. Percentages are by weight unless otherwise indicated. Mesh sizes are those of Tyler screens. In conformity with common practice in reporting chemical analyses of refractory materials, the proportions of the various chemical constituents present in a material are given herein as though these constituents were present as the simple oxides, although they may actually be present in combinations with each other or with constituents not specifically described. Thus, the magnesium constituent is reported as magnesium oxide, MgO, although it may be present in combination with silica as a magnesium silicate.

The particle sizes have been shown in the examples as passing 80 mesh and retained on 200 mesh. However, other particle sizes generally useful in mortars can be employed herein. In chrome ore mortars it has been found advantageous to employ in this invention, in some embodiments, chrome ore of particle sizes through a 35 mesh screen with the production of a mortar which is especially free from cracks upon drying. In the specification and claims "chromite" is intended to mean "chrome ore."

Having now described the invention, what is claimed is:

1. A refractory mortar containing a major portion of finely divided magnesium oxide and a water soluble polymer of the sodium salt of acrylic acid, in quantities of from 0.05% to 1.0% by weight of the total mix.

2. A refractory mortar consisting essentially of a major portion of at least one finely divided material of the group consisting of chromite and aluminum, and magnesium oxides, and a water soluble polymer of the sodium salt of acrylic acid in quantities of from 0.05% to 1.0% by weight of the total mix.

3. A refractory mortar consisting essentially of a major portion of magnesium oxide, a minor portion of bentonite and from 0.05% to 1.0% by weight of the total mix of a water soluble polymer of the sodium salt of acrylic acid.

4. A refractory mortar consisting essentially of a major portion of at least one finely divided material of the group consisting of chromite and aluminum, and magnesium oxides, a minor portion of sodium silicate and bentonite, and from 0.05% to 1.0% by weight of the total mix, of a water soluble polymer of the sodium salt of acrylic acid.

5. A refractory mortar consisting essentially of finely diveded chromite and from 0.05% to 1.0% by weight of the total mix of a water-soluble polymer of the sodium salt of acrylic acid.

6. Composition as in claim 5 wherein said chromite is of particle sizes passing 80 mesh and retained on 200 mesh.

7. Composition as in claim 5 wherein said polymer has a viscosity of 170 cps. in 5% water solution at pH 9 and a temperature of 30° C., and has a pH of 9.0 to 10.0 in 1% water solution.

8. A refractory mortar consisting essentially of finely divided chromite, a minor amount of bentonite, a minor amount of sodium silicate and from 0.05% to 1.0% by weight of the total mix of a water-soluble polymer of the sodium salt of acrylic acid.

References Cited in the file of this patent

UNITED STATES PATENTS

| 1,564,394 | Youngman | Dec. 8, 1925 |
| --- | --- | --- |
| 1,714,506 | Heuer | May 28, 1929 |
| 1,811,314 | Haglund | June 23, 1931 |
| 2,572,688 | Austin | Oct. 23, 1951 |
| 2,614,998 | Lea | Oct. 21, 1952 |
| 2,702,751 | Austin et al. | Feb. 22, 1955 |
| 2,947,649 | Davies | Aug. 2, 1960 |

OTHER REFERENCES

Hackh's Chemical Dictionary, 3rd edition, page 199.